United States Patent [19]

Wang et al.

[11] 4,287,484
[45] *Sep. 1, 1981

[54] SEGMENTED HOLLOW CATHODE LASER DEVICE

[75] Inventors: Shing C. Wang, Temple City; Randolph W. Hamerdinger, Glendora, both of Calif.

[73] Assignee: Xerox Corporation, Stamford, Conn.

[*] Notice: The portion of the term of this patent subsequent to Sep. 1, 1998, has been disclaimed.

[21] Appl. No.: 948,077

[22] Filed: Oct. 2, 1978

[51] Int. Cl.³ ............................................. H01S 3/03
[52] U.S. Cl. .......................... 331/94.5 G; 331/94.5 D
[58] Field of Search .................. 331/94.5 PE, 94.5 D, 331/94.5 G

[56] References Cited

U.S. PATENT DOCUMENTS

| | | | |
|---|---|---|---|
| 3,469,207 | 9/1969 | Solomon et al. | 331/94.5 D |
| 3,720,877 | 3/1973 | Zarowin | 331/94.5 G |
| 3,868,593 | 2/1975 | Fukuda et al. | 331/94.5 D |
| 3,883,818 | 5/1975 | Heising et al. | 331/94.5 G |
| 3,934,211 | 1/1976 | Sucov et al. | 331/94.5 PE |
| 4,021,845 | 5/1977 | Wang | 331/94.5 G |

OTHER PUBLICATIONS

Fujii et al., "Hollow-Cathode-Type white light laser", *IEEE Journal of Quantum Electronics,* vol. QE-11, No. 3, pp. 111-114, Mar. 1975.

Primary Examiner—William L. Sikes
Assistant Examiner—Leon Scott, Jr.
Attorney, Agent, or Firm—Franklyn C. Weiss

[57] ABSTRACT

A laser device for generating multiline emissions when appropriately energized. The device consists of two major components, an anode-cathode assembly and, in a first embodiment, an adjustable brewster end section or in a second embodiment, an integral mirror end section. The anode-cathode assembly comprises one center located short cylindrical anode and two segmented cylindrical hollow cathodes located symmetrically on each side of the anode. The anode and cathode are electrically insulated by a cylindrical metal ceramic seal. The outer surface of the cathode is covered with quartz insulating sleeves to prevent electrical discharge from the outer cathode surface and to encourage effective inner cathode discharge. The cathode is thermally connected to the external environment through a structure coupled to the cathode and the laser tube envelope thus allowing heat generated within the cathode due to the electrical discharge to be effectively conducted away thereby allowing higher input power load into the cathode for selected lasing action which requires a relatively high excitation input. A metal vapor reservoir may be provided and is preferably attached to the anode section for metal vapor laser operation. While the controlled amount of the metal vapor is released into the anode section, it is transported through each cathode section by natural diffusion and cataphoretic action which provides near uniform vapor density throughout the cathode sections. The laser device of the present invention can be made up of one or more anode-cathode assemblies depending on the laser medium and the selected output requirement.

15 Claims, 4 Drawing Figures

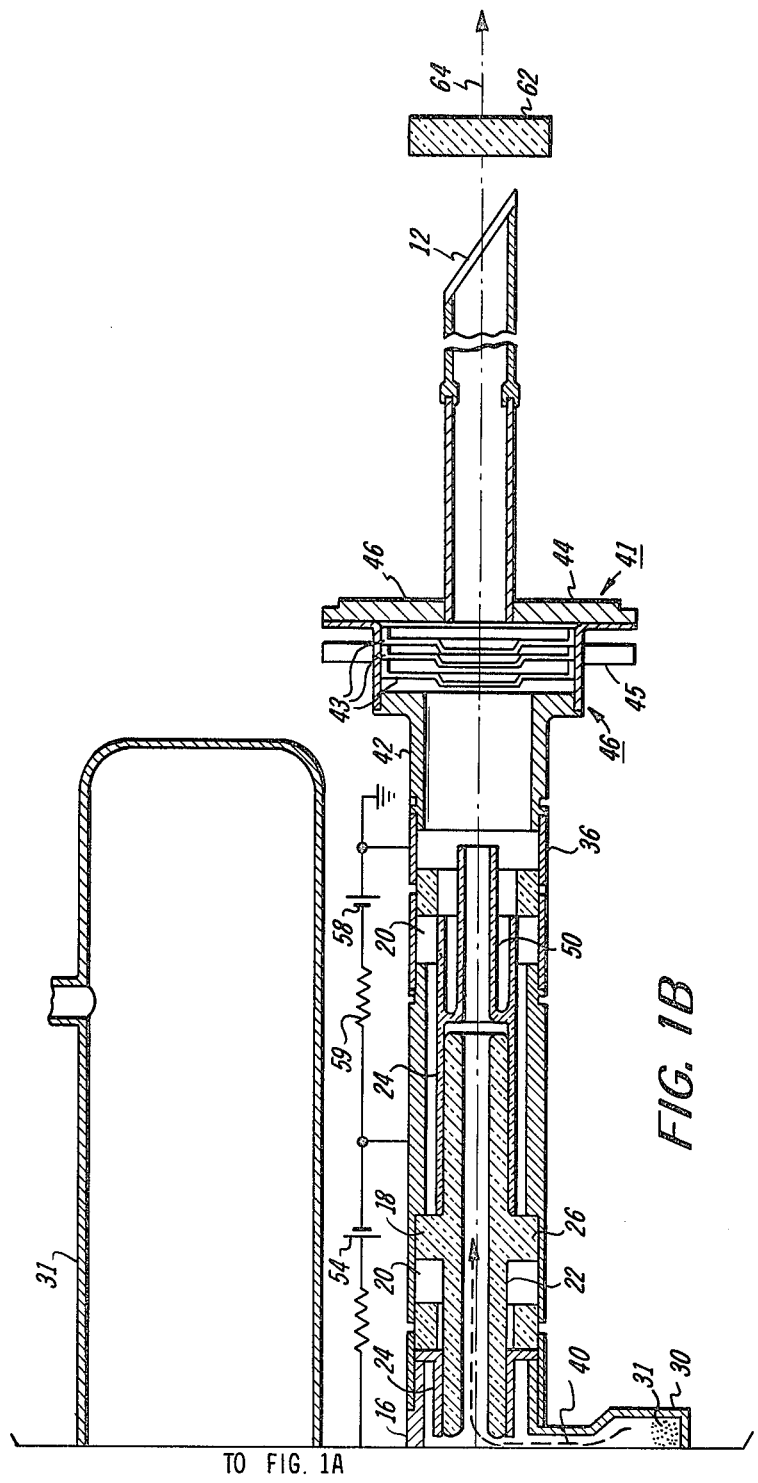

SEGMENTED HOLLOW CATHODE LASER DEVICE

BACKGROUND OF THE INVENTION

The present state of laser technology has advanced substantially from that available in prior years. For example, a variety of laser devices, including gas lasers, dye lasers and solid state lasers are available for particular customer applications. At this time, a substantial portion of the commercially marketed lasers are of the gas variety. The gas lasers available are generally limited to a laser device which produces only a single wavelength (emission line) or a single color output. For example, helium-neon laser devices which are available commercially generates only the red wavelength (i.e. 6328Å) output. Although argon ion gas lasers are available which are capable of simultaneously producing blue and green output light, the argon gas laser is considered to be too costly, inefficient and cumbersome as far as size is concerned to have extensive commercial applications.

The laser disclosed in U.S. Pat. No. 4,021,845 produces white light (light having multiple lines) which includes three of the primary colors; red, blue and green. The laser is very advantageous since an end user has the capability of selecting a desired wavelength(s) for a particular application from a plurality of available wavelengths, the laser being relatively inexpensive and of a physical size which makes it attractive for many commercial applications.

Although the laser described in the aforementioned patent has performed satisfactorily, a more compact and controllable type of laser which can be operated at a higher input density would be desirable. Further, it would be desirable if the basic configuration of the laser could be easily expandable to allow the power level for a selected wavelength to be increased depending on the type of application required. In other words, what is desired is a multiline laser device which is capable of operating at high input power densities which in turn allows the power level for a particular wavelength desired to be increased, has improved stability characteristics, is compact and is cost effective while providing the multiple line output.

SUMMARY OF THE PRESENT INVENTION

The present invention provides a laser device for generating multi line emissions when appropriately energized. The device consists of two major components, an anode-cathode assembly and in a first embodiment, an adjustable brewster end section or in a second embodiment, an integral mirror end section. The anode-cathode assembly comprises one center located short cylindrical anode and two segmented cylindrical hollow cathodes located symmetrically on each side of the anode. The anode and cathode are electrically insulated by a cylindrical metal ceramic seal. The outer surface of the cathode is covered with quartz insulating sleeves to prevent electrical discharge from the outer cathode surface and to encourage effective inner cathode discharge. The cathode is thermally connected to the external environment through a structure coupled to the cathode and the laser tube envelope thus allowing heat generated within the cathode due to the electrical discharge to be effectively dissipated away thereby allowing higher input power load into the cathode for selected lasing action which requires a relatively high excitation input. A metal vapor reservoir may be provided and is preferably attached to the anode section for metal vapor laser operation. While the controlled amount of the metal vapor is released into the anode section, it is transported through each cathode section by natural diffusion and cataphoretic action which provides near uniform vapor density throughout the cathode sections. An auxiliary anode is provided in the end sections and serves to provide a discharge into the cathodes to increase the uniformity of the discharge and to cataphoretically retain the metal vapor within the cathodes to prevent the metal vapor from depositing on the end mirrors/windows. The laser device of the present invention can be made up of one or more anode-cathode assemblies depending on the laser medium and the selected output requirement.

It is an object of the present invention to provide a laser which provides simultaneous multi-line emissions of laser light.

It is a further object of the present invention to provide a multi-line emission laser having improved stability and controllability characteristics.

It is still a further object of the present invention to provide a multi-line emission laser comprising one or a plurality of anode-cathode assemblies, each assembly comprising one center located short cylindrical anode and two segmented hollow cathodes located symmetrically on each side of the anode.

It is a further object of the present invention to provide a multi-line emission laser comprising one or a plurality of anode-cathode assemblies, each assembly comprising one center located short cylindrical anode and two segmented hollow cathodes located symmetrically on each side of the anode, the cathodes being thermally connected to the surrounding environment through a structure coupled to the cathode and the laser tube envelope thus allowing heat generated within the cathode due to the electrical discharge to be effectively dissipated away.

It is an object of the present invention to provide a multi-line emission gas vapor laser having improved stability and controllability characteristics and comprising one or a plurality of anode hollow cathode assemblies, the hollow cathodes being segmented to allow the vapor density through the hollow-cathodes to be substantially uniform.

It is a further object of the present invention to provide a multi-line emission laser as described which further comprises auxilary anodes in end sections associated with each laser the auxilary anodes serving to provide a discharge in the cathodes to increase the uniformity of the discharge and to cataphoretically contain the metal vapor within the cathodes to prevent the metal vapor from depositing on the end mirrors/windows.

DESCRIPTION OF THE DRAWING

For a better understanding of the invention as well as other objects and further features thereof, reference is made to the following description which is to be read in conjunction with the drawing wherein:

FIGS. 1A and 1B together is a cross-sectional view of the laser shown in FIG. 1.

DESCRIPTION OF THE PREFERRED EMBODIMENTS

Figure 1:
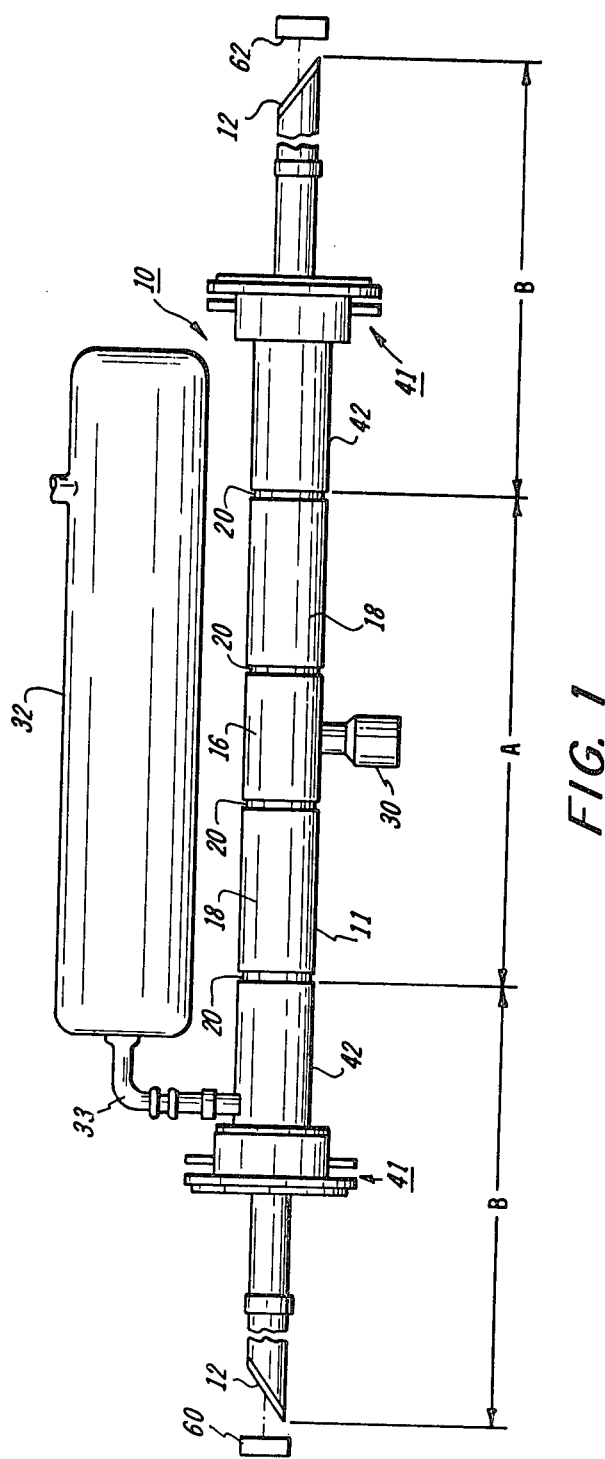
FIG. 1 is a side view of the laser of the present invention which utilizes Brewster windows.
Figure 1A:
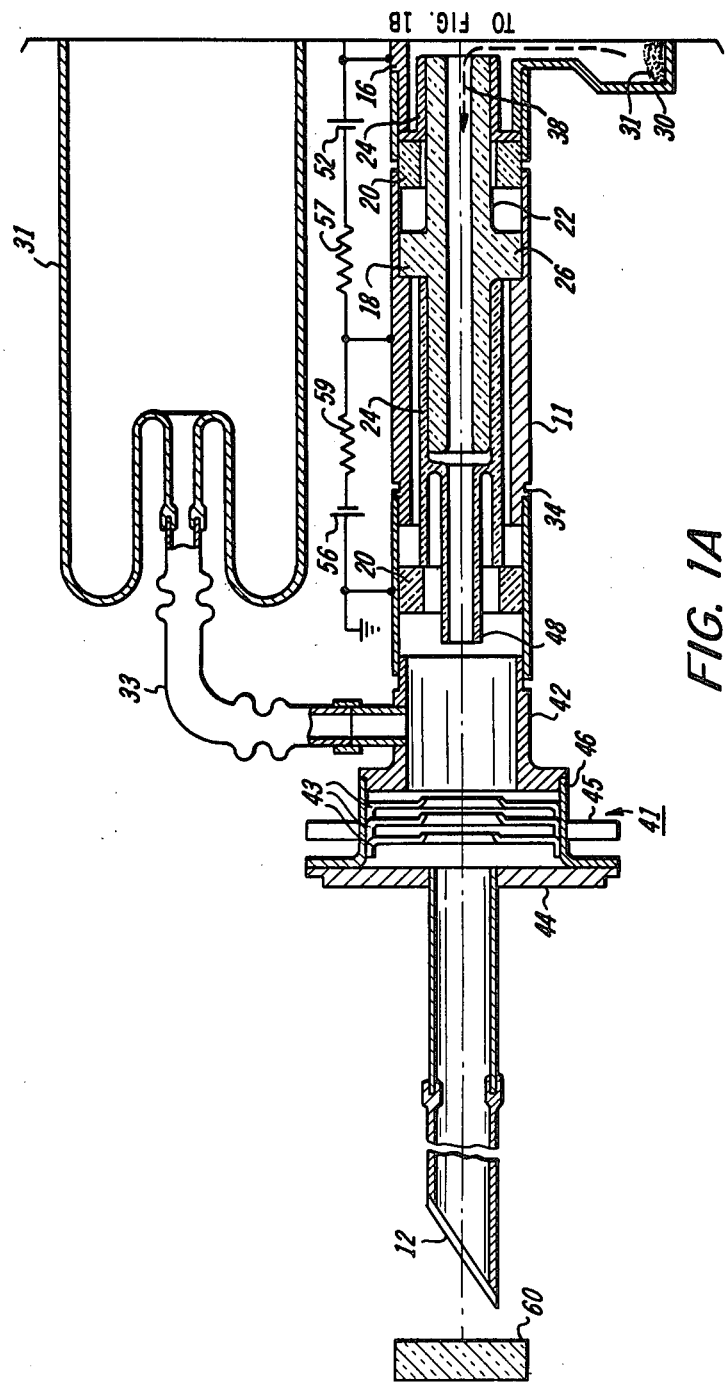

Referring to FIGS. 1, 1A and 1B, an embodiment of the laser tube device 10 of the present invention is illustrated, the embodiment utilizing Brewster windows 12. The laser device of the present invention, which includes laser tube envelope 11, may be thought of as comprising two major components, anode-cathode assembly A and Brewster window end sections B.

The anode-cathode assembly A comprises a center-located short cylindrical anode 16, and two segmented cylindrical hollow cathodes 18 located symmetrically on each side of the anode 16. The anode 16 and cathode 18 are electrically insulated by cylindrical metal-to-ceramic seals 20. A substantial portion of the outer surface 22 of each cathode 18 is partially covered with glass or ceramic insulating sleeves 24 to prevent electrical discharge in the outer cathode surface and promote effective inner cathode discharge. The cathodes, made preferably of molybdenum, are thermally connected to the external environment through structure 26 and the laser tube envelope 11 which is made of stainless steel or Kovar. Structures 26, preferably cylindrical in shape, can be separately made and secured to the cathodes or made as part of the cathode structure as shown. Thus, the heat generated within the cathodes due to the electrical discharge can be effectively conducted away to the environment which allows higher laser input power loading to the cathodes when higher laser excitation power is required for certain laser actions. For example, argon as the active laser medium requires more power than cadmium for laser operation. Further, this feature allows the laser device to be more compact than would otherwise be possible. For laser operation utilizing metal vapors, a reservoir 30 containing the particular metal 31 to be utilized is provided and comprises part of the anode-cathode assembly A. The reservoir 30 is thermally decoupled from the anode-cathode assembly A through a heat-choke arrangement so that the metal vapor pressure can be separately and independently controlled by external heater means (not shown). Although reservoir 30 is shown connected within anode 16, the reservoir could be connected directly into the bore of a cathode 18 if desired. In the embodiments illustrated in the figures, an auxiliary gas, such as helium, is stored in reservoir 32 and connected into the main tube envelope 11 via tubing 33. Although gases other than helium may be utilized, helium will be discussed hereinafter since the laser of the present invention is particularly useful in helium-cadmium or other helium-metal vapor, helium-rare gas, helium-metal halides and dimer lasers. In the case when cadmium metal is to be utilized as the active lasing medium, a predetermined charge of cadmium metal 31 is placed in reservoir 30 and the reservoir is then heated. A controlled amount of metal vapor is released into the anode section, and is transported from anode 16 through each cathode section by natural diffusion and D.C. cataphoresis action. The path of the vapor flow is illustrated by reference numerals 38 and 40. Thus, near uniform vapor density can be assured within and throughout the cathode sections 18. The adjustable Brewster window end sections B are attached to each end of the anode-cathode assembly A. Each section comprises a Brewster window 12, an auxilary anode portion 42 for providing an auxiliary discharge into cathode 18 to assure discharge uniformity within cathode 18 and, in conjunction with finite positive column discharge section 48, metal vapor can be prevented from reaching the end window 12 (or mirror 76 in the FIG. 2 embodiment) by DC cataphoretic confinement, and a metal vapor condensor portion 41. Metal vapor condensor portion 41 comprises a flexible flange 44 and one rigid flange 45, a fixture 46 acting as a condensing baffle to protect against the diffusion of metal vapor, such as cadmium, to windows 12. The fixture 46 comprises a plurality of apertured Kovar discs 43. Adjustment of fixture 46 by screws (not shown) allows adjustment of the Brewster angle of window 12 which can compensate for any offset from the correct angle due to the final assembly processes.

Auxiliary anode 42 contributes an auxiliary discharge to the main discharge in providing a uniform discharge throughout the cathode section and also inhibits movement of the metal vapor towards Brewster windows 12 by the cataphoretic effect.

Sections 48 and 50, made of glass or quartz, are also provided to guide the electrical discharge into the inner bore of the cathode 18 along paths 38 and 40.

It should be noted that the laser device 10 can comprise more than one anode-cathode assembly depending upon the particular laser transition and power desired. The device of the present invention has operated successfully with only one anode-cathode assembly and has obtained laser action in both helium-neon and helium-cadmium mixtures. It should be noted that other active lasing media could be utilized, such as metals (such as zinc and selenium), metal halides (such as copper chloride and mercury chloride), rare gases (such as helium-xenon and helium-krypton) and selenium iodide (dimer type lasers). The preferred assembly (the embodiment shown in FIGS. 1, 1A and 1B) has an envelope window to window spacing of about 42 cm, 2.0 cm outside diameter, 1.7 cm inside diameter, a molybdenum hollow cathode 18 of approximately 5 cm length, 0.3-cm inside diameter, and 0.9-cm outside diameter on each side, and a stainless steel anode of 1.6-cm length, 1.5-cm inside diameter and 2.0-cm outside diameter with reservoir 30 filled with cadmium. The d.c. electrical discharge between anode 16 and cathodes 18 is maintained at a d.c. voltage level in the range of from about 250 to about 350 volts by voltage sources 52 and 54 with a corresponding variable current ranging from about 20–200 milliamps being maintained. Voltage sources 56 and 58 apply a potential between the auxiliary anodes 42 via appropriate ballast resistors 59. The discharge within the cathodes 18 is operated in the mode of negative glow discharge. The active length of the device is about 10 cm and CW laser action is obtained in the He-Ne red (6328Å) transition at 2–3 Torr and a He:Ne (helium-neon) ratio = 7:1; and all visible colors (red, 6360Å, 6350Å, green, 5337Å, 5378Å; and blue, 4416Å) transition in the He-Cd laser is obtained at about 10 Torr of helium and a cadmium temperature of about 310° C.

By appropriate choice of reflectors 60 and 62 which form the optical resonator, a desired output wavelengths(s) can be produced. Reflectors 60 and 62 may be multiple layer dielectric coated reflectors, reflector 62 being typically adapted to be partially transmissive to enable a portion 64 of the coherent radiation to be extracted from the laser device 10. Reflector 62 may be a broadband output reflector if output 64 is multicolor.

The principle advantage of the present invention is provided by the segmentation of the hollow cathode into at least two segments. Segmentation allows a substantially uniform and controllable discharge to occur inside the cathode segments which therefore provides a substantially uniform excitation and vapor density inside the cathode to assure effective pumping of the laser transition and to create a more efficient laser light output. Further, outer cathode structure 26 provides a more efficient way of dissipating the power generated in the cathodes thereby allowing higher power output density loading. The present invention also allows the design of laser power output levels for each selected laser medium by adjusting the number of assemblies, thus adjusting the active length and gain of the laser, the overall laser gain being proportional to the active length (total length of discharge within cathodes) of the laser. For example, for a helium-cadmium laser operating at approximately 10 Torr of helium, a voltage of 280 volts, a total current in each cathode section of approximately 140 milliamps (about 30 ma/cm$^2$) and a cadmium temperature of 310° C., a single cathode-anode assembly (two cathodes 18 and one anode 16) system will provide a blue and green line at 4–5 milliwatts of power and the red line at 0.5 milliwatts of power (one cadmium reservoir); for a dual cathode-anode assembly (four cathodes 18 and three anodes 16) system, the blue and green lines will have a power of 15 milliwatts associated therewith and a red line having 2 milliwatts of power associated therewith (three cadmium reservoirs). In this latter configuration, the third anode is provided to interact with two intermediate cathodes. It is obvious that other configurations could be provided. For example, a three cathode, two anode (two cadmium reservoir) could be provided, the middle cathode being common to two cathode-anode assemblies.

The laser configuration for the additional assemblies is similar to the single cathode-anode assembly shown in the figures, the additional assemblies being arranged coaxially between the end sections along the optical axis of the laser 10.

Figure 2:
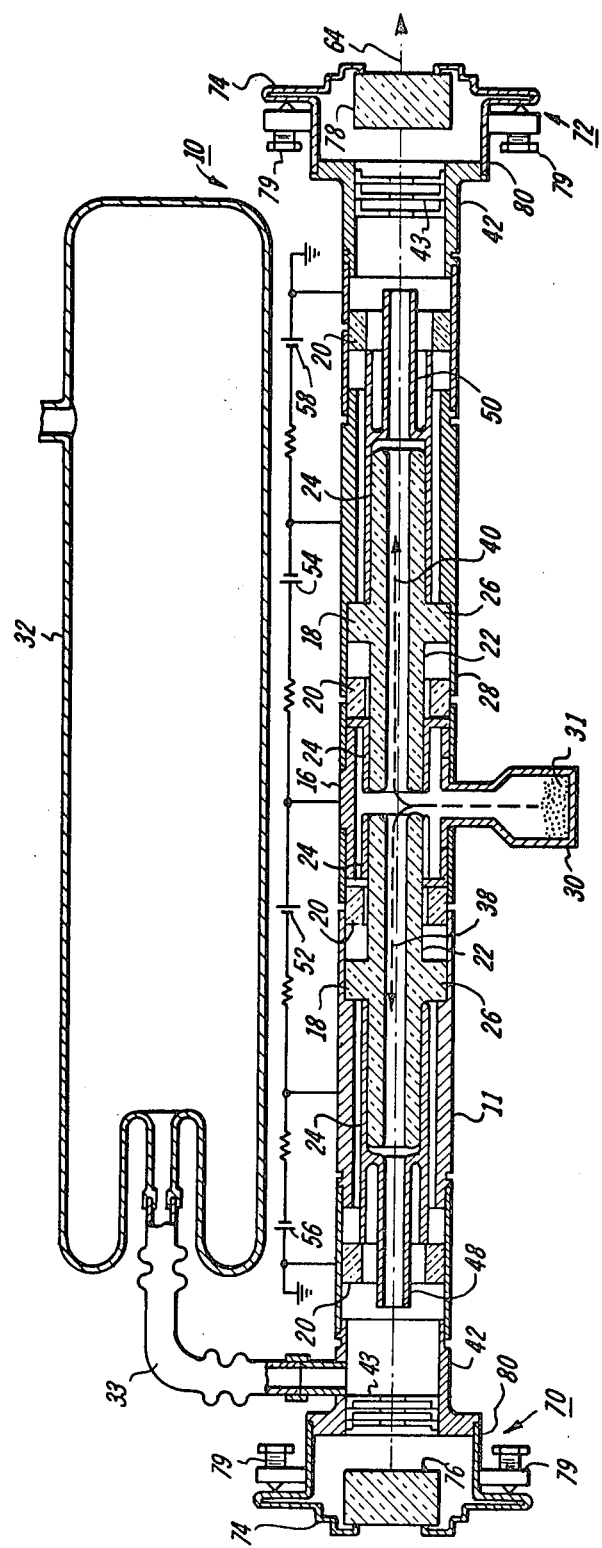
FIG. 2 is a cross-sectional view of the laser of the present invention utilizing integral mirrors.

The FIG. 2 embodiment is substantially identical to the embodiment shown in FIGS. 1, 1A and 1B with the exception that the Brewster window end section B and the optical reflectors 60 and 62 are replaced with integral mirror subassemblies 70 and 72. Each subassembly comprises an apertured flange member 74, mirrors 76 and 78 bonded to the flange members 74, a metal flange member 80, sealed to the end of the tube envelope 11, which is welded to flange member 74 and mirror adjustment screws 79. Further, in lieu of the complete portion 41, only the metal vapor condensing baffles 43 are located within the envelope 11 adjacent the auxilary anode portion 42. Mirror 78 is selected to allow laser light 64 to be extracted from the laser 10.

The laser mirrors 76 and 78 are coated for particular wavelengths of the laser transition and form an integral part of the whole laser device 10.

The whole laser device 10 is made of all metal structure, preferably stainless steel, except for the molybdenum hollow cathode sections and the high temperature metal-to-ceramic seal insulation utilized. The gas ballast reservoir 32 may also be made of stainless steel material. Typically, the over-all length of the laser device 10 between mirrors 76 and 78 is about 25 cm which is substantially less than the over-all length of the embodiment shown in FIGS. 1, 1A and 1B. The laser device is compact and rugged structure and requires no external optical resonator structure and no Brewster windows. It also minimizes the power fluctuation due to ambient air turbulent flow within the laser resonator. The integral mirror subassemblies are described in detail in copending Application Ser. No. 850,314, filed Nov. 10, 1977 assigned to the assignee of the present invention, the teachings of which are necessary for an understanding of the present invention being incorporated herein by reference.

It should be noted that both embodiments described hereinabove provided, in particular, an intense blue or green output light having many potential applications.

Although the passive gas ballast reservoir 32 has worked successively, the active helium pressure regulator described in copending Application Ser. No. 885,839, filed Mar. 13, 1978 assigned to the assignee of the present invention, may also be utilized.

A detailed description of typical gas laser operation is not set forth herein for the purposes of brevity. The operation, for example, of helium-neon lasers is well known in the art as is the operation of metal vapor lasers, such as helium-cadmium lasers. The aforementioned U.S. Pat. No. 4,021,845 describes the operation of a typical helium-cadmium laser.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A laser device for producing an output laser beam having a plurality of wavelengths comprising:
   an envelope having a longitudinal axis,
   an anode electrode forming a portion of said envelope, said anode electrode being coaxially disposed with respect to said longitudinal axis, at least two separate hollow cathodes located within said envelope, said hollow cathodes being coaxially disposed with respect to said longitudinal axis,
   said hollow cathodes each having a portion thereof coupled to said envelope whereby the heat generated in said hollow cathodes is dissipated to the external environment,
   coaxially aligned mirror end members, said mirror end members sealing said envelope thereby providing a resonant cavity and a structure for confining a gaseous medium therein,
   means for supplying an active gaseous medium having an absorption band such that it will lase at wavelengths supported by said resonant cavity in said envelope, and
   means for applying a voltage between said anode electrode and said hollow-cathodes whereby a discharge between said cathodes and said anode electrode is created causing said gaseous medium to lase, a laser output beam having a plurality of wavelengths thereby being produced, said output beam being abstracted from one of said mirror end members.

2. The laser device as defined in claim 1 wherein said gaseous medium comprises a metal vapor.

3. The laser device as defined in claim 1 wherein said gaseous medium comprises a rare gas.

4. The laser device as defined in claim 1 wherein said gaseous medium comprises a metal halide vapor.

5. The laser device as defined in claim 1 wherein said gaseous medium comprises first and second gases.

6. The laser device as defined in claim 5 wherein said first gas comprises helium.

7. The laser device as defined in claim 6 wherein said second gas comprises cadmium.

8. A laser device for producing an output laser beam having plurality of wavelengths comprising:

an envelope having a longitudinal axis, an anode electrode forming a portion of said envelope, said anode electrode being coaxially disposed with respect to said longitudinal axis, at least two separate hollow cathodes located within said envelope, said hollow cathodes being coaxially disposed with respect to said longitudinal axis, said hollow cathodes each having a portion thereof coupled to said laser envelope whereby the heat generated in said hollow cathodes is dissipated to the external environment, coaxially aligned Brewster windows for sealing said envelope thereby providing a structure for confining a gaseous medium therein and further including reflectors coaxially aligned and adjacent each of said Brewster windows, said reflectors forming a resonant cavity, means for supplying an active gaseous medium having an absorption band such that it will lase at wavelengths supported by said resonant cavity in said envelope, and means for applying a voltage between said anode electrode and said hollow-cathodes whereby a discharge between said cathodes and said anode electrode is created causing said gaseous medium to lase, a laser output beam having a plurality of wavelengths thereby being produced, said output beam being abstracted from one of said reflectors.

9. The laser device as defined in claim 8 wherein said gaseous medium comprises a metal vapor.

10. The laser device as defined in claim 8 wherein said gaseous medium comprises a rare gas.

11. The laser device as defined in claim 8 wherein said gaseous medium comprises a metal halide vapor.

12. The laser device as defined in claim 8 wherein said gaseous medium comprises first and second gases.

13. The laser device as defined in claim 12 wherein said first gas comprises helium.

14. The laser device as defined in claim 13 wherein said second gas comprises cadmium.

15. A hollow-cathode metal vapor laser tube comprising an envelope having a longitudinal axis, a hollow-cathode including a plurality of tubular cathode members aligned along said longitudinal axis and coaxially spaced from one another by a predetermined interval, each cathode having a portion thereof coupled to said envelope whereby the heat generated in each cathode is dissipated to the external environment, an anode including a plurality of tubular anode members interposed between adjacent ones of said cathode members and surrounding said cathode members with their axis aligned with said common axis, means for electrically insulating each of said cathode member-anode member combinations from the neighboring cathode member-anode member combinations, means associated with said laser tube for forming a resonant cavity, means for introducing a gaseous medium into said laser tube, said medium having an absorption band such that it will lase at wavelengths supported by said resonant cavity, and means for initiating a discharge within said laser tube causing said gaseous medium to lase and means for abstracting a laser output beam from said laser tube, said laser output beam comprising a plurality of wavelengths.

* * * * *

UNITED STATES PATENT AND TRADEMARK OFFICE
CERTIFICATE OF CORRECTION

PATENT NO. : 4,287,484

DATED : September 1, 1981

INVENTOR(S) : Shing C. Wang; Randolph W. Hamerdinger

It is certified that error appears in the above-identified patent and that said Letters Patent are hereby corrected as shown below:

Cover page, left column, disclaimer notice beginning with "[*]", delete "Sep. 1, 1998", and insert —March 10, 1998—.

Signed and Sealed this

Twenty-fourth Day of November 1981

[SEAL]

Attest:

GERALD J. MOSSINGHOFF

Attesting Officer    Commissioner of Patents and Trademarks